(12) United States Patent
Gehring et al.

(10) Patent No.: US 7,793,017 B2
(45) Date of Patent: Sep. 7, 2010

(54) CONNECTION MODULE FOR SENSORS

(75) Inventors: Roland Gehring, Elzach-Prechtal (DE);
Matthias Singler, Winden (DE);
Friedrich Esselborn, Waldkirch (DE);
Johannes Aschenbrenner,
Emmendingen (DE)

(73) Assignee: Sick AG, Waldkirch/Breisgau (DE)

( * ) Notice: Subject to any disclaimer, the term of this patent is extended or adjusted under 35 U.S.C. 154(b) by 521 days.

(21) Appl. No.: 11/820,289

(22) Filed: Jun. 19, 2007

(65) Prior Publication Data

US 2008/0004726 A1    Jan. 3, 2008

(30) Foreign Application Priority Data

Jun. 30, 2006    (EP)  .................................. 06013606

(51) Int. Cl.
| | |
|---|---|
| G06F 13/12 | (2006.01) |
| G06F 13/38 | (2006.01) |
| G06F 3/00 | (2006.01) |
| G05B 23/02 | (2006.01) |
| G05B 11/01 | (2006.01) |
| G05B 9/02 | (2006.01) |
| G01C 25/00 | (2006.01) |
| G01R 27/28 | (2006.01) |
| G01R 31/14 | (2006.01) |

(52) U.S. Cl. .............................. 710/63; 710/10; 710/16; 710/72; 340/3.31; 340/3.32; 700/21; 700/79; 702/116; 702/117

(58) Field of Classification Search .................. 340/3.1, 340/3.3, 3.31; 710/2, 5, 8, 10, 15–19, 62–65, 710/72; 702/33, 45, 50, 57, 127, 188, 189; 700/19, 21, 65, 79, 83

See application file for complete search history.

(56) References Cited

U.S. PATENT DOCUMENTS

| | | | | |
|---|---|---|---|---|
| 4,955,032 | A * | 9/1990 | Potzler et al. | 372/50.21 |
| 6,013,108 | A * | 1/2000 | Karolys et al. | 702/189 |
| 6,427,129 | B1 * | 7/2002 | Lalla | 702/88 |
| 6,571,132 | B1 | 5/2003 | Davis et al. | |
| 6,968,276 | B2 * | 11/2005 | Diewald | 702/45 |
| 6,975,952 | B1 * | 12/2005 | Dietermann et al. | 702/117 |
| 7,002,771 | B2 * | 2/2006 | Christie et al. | 360/77.12 |
| 7,299,310 | B2 * | 11/2007 | Aschenbrenner | 710/71 |
| 7,587,953 | B2 * | 9/2009 | Wittmer | 73/866.1 |
| 2003/0040881 | A1 | 2/2003 | Steger et al. | |

(Continued)

OTHER PUBLICATIONS

Official Communcation of the European Patent Office dated Nov. 1, 2007 for German Application No. 06013606.6-1239, filed Jun. 30, 2006.

*Primary Examiner*—Crystal J Barnes-Bullock

(57) ABSTRACT

A connector module for the connection of a sensor, such as an optoelectronic sensor, to a fieldbus, having a sensor interface for the connection of the connector module to an interface of the sensor, a bus interface for the connection of the connector module to an interface of a fieldbus and a circuit for the exchange of data to receive data from the sensor interface and to convert them with respect to their format and to output the converted data at the bus interface. The circuit for the exchange of data includes a memory for the intermediate storage of a sensor-specific control file or description file received from the sensor interface, with the control file or description file being able to be processed in the circuit such that the connector module shows the behavior of the respective connected sensor with respect to the fieldbus.

19 Claims, 2 Drawing Sheets

U.S. PATENT DOCUMENTS

| | | | |
|---|---|---|---|
| 2005/0234592 A1* | 10/2005 | McGee et al. | 700/245 |
| 2005/0278081 A1* | 12/2005 | Mayer et al. | 701/1 |
| 2006/0031577 A1* | 2/2006 | Peluso et al. | 709/243 |
| 2006/0129347 A1* | 6/2006 | Gadh et al. | 702/127 |
| 2006/0259166 A1* | 11/2006 | Hoffman et al. | 700/80 |
| 2007/0214770 A1* | 9/2007 | Martin et al. | 60/276 |
| 2007/0262847 A1* | 11/2007 | Grabinger et al. | 340/3.1 |
| 2007/0284293 A1* | 12/2007 | Pitchford et al. | 210/85 |

* cited by examiner

CONNECTION MODULE FOR SENSORS

CROSS-REFERENCE TO RELATED APPLICATIONS

This application claims the benefit of European Patent Application No. 06 013 606.6, filed Jun. 30, 2006.

FIELD

The invention relates to a connector module for the connection of a sensor to a fieldbus as well as to a method of operating a connector module of this type

BACKGROUND

A fieldbus is an industrial communications system which e.g. connects a plurality of field devices such as measuring probes (sensors), control members and drives (actuators) to a control device. In this connection, as a rule, a fieldbus system replaces a complex and/or expensive parallel wiring of the fieldbus components with a substantially more cost effective serial networking for digital data transmission.

In the simplest case, sensors are connected directly to the fieldbus. An improvement with respect to the direct connection is described, for example, in DE 103 53 345 A1, according to which so-called fieldbus gateways serve for the coupling of a sensor to the fieldbus. They effect a conversion of data in the data format of the fieldbus into a data format which is understood by the sensor, and vice versa, in order thus to permit a problem-free communication between the sensor and the fieldbus. Not only the hardware-side connection of sensors which are very small in part to the fieldbus is thus possible, but also a connection of a specific sensor type to different bus systems. The connection function is transposed from the sensor into the gateway.

External gateways of this type, that is gateways not integrated in the sensor, usually have fixed identification numbers in the respective communications system and also appear directly as a gateway with respect to the fieldbus. A sensor connected to the gateway, in contrast, cannot be addressed directly from the fieldbus, but rather only via the gateway.

Different data packets, so-called objects, can be transmitted to the fieldbus from a sensor. Objects of this type can, in a temperature sensor for example, be the current temperature or the maximum value of the respective measured temperatures.

Previously used gateways can only transmit specific, fixedly predetermined objects between the sensor and the fieldbus. This can be imagined in figurative terms such that fixedly predetermined "shelves" are present in a gateway and the objects of the sensor can be placed onto them from where they can be "collected" by the fieldbus. However, this only works for those objects for which a suitable "pigeonhole" is present. Objects for which no suitable "pigeonhole" is present cannot be transmitted to the fieldbus, which ultimately means that only a limited operation of the sensor is available to the fieldbus in a disadvantageous manner.

This disadvantage can only be eliminated in a complex and/or expensive manner in that fieldbus gateways are provided adapted to each sensor type which are in a position to transmit all the objects of a sensor to the fieldbus.

SUMMARY

It is the object of the present invention to facilitate the linking of sensors into a fieldbus network.

This object is satisfied by a connector module having the features of claim 1 and in particular by a connector module for the connection of a sensor, in particular of an optoelectronic sensor, to a fieldbus, having at least one sensor interface for the connection of the connector module to an interface of the sensor, at least one bus interface for the connection of the connector module to an interface of a fieldbus and a circuit for the exchange of data in order to receive data from the sensor interface and to convert them with respect to their format and in order to output the converted data at the bus interface, with the circuit for the exchange of data including a memory for the intermediate storage of a sensor-specific control file or description field received from the sensor interface, with the control file or description file being able to be processed in the circuit such that the connector module shows the behavior of the respectively connected sensor with respect to the fieldbus.

Transferred to the initially mentioned image of a shelf, this means that a new "shelf is put up" by the generation or transmission of the control file in the connector module, said shelf corresponding exactly to one similar shelf existing in the sensor and accepting all the possible objects of the sensor. All the objects of the sensor can thus be transmitted to the fieldbus.

It can be achieved in this manner that the connector module communicates with the fieldbus so-to-say as the substitute for the sensor so that the connector module ultimately appears as a sensor with respect to the fieldbus and not as a gateway or connector module.

Since the connector module in accordance with the invention can be changed in its manner of functioning at any time by the generation or transmission of the control file and can be adapted to the respective circumstances, it can also be used without modification for sensors not yet existing on the production of the connector module and still to be developed in the future. The user can thereby swap sensors as desired without simultaneously also having to replace the connector module.

In a preferred embodiment of the invention, the circuit can include a processor programmable by the stored control file and/or the control file generated on the basis of the description file. In the first variant of this embodiment, an already generated control file stored in the sensor is transmitted to the connector module. Information on all the objects of the sensor can likewise be contained in this control file which already represents the complete program which runs in the processor of the connector module. In the second variant of the embodiment, the description file stored in the sensor includes an index of the objects which the sensor can receive and/or make available. These objects can be measured values, parameters, status information, etc., for example. A control file, that is a program for the control of the exchange of data between the sensor interface and the bus interface which determines the operation of the processor present in the connector module, is then generated automatically from the description file in the connector module in accordance with the invention.

The control file or description file can advantageously contain a sensor-specific device identification for the respective fieldbus.

The sensor interface and/or the bus interface can in particular be configured for serial data communication so that the cabling effort to be made can be kept to a minimum.

In a preferred embodiment, the circuit for the exchange of data is also configured for the reception of data from the bus interface. It is hereby possible for the connector module to be able to accept data from a further device connected to the fieldbus.

The circuit for the exchange of data can preferably also be configured for the output of the data received from the bus interface at the sensor interface. It is thereby possible for devices connected to the fieldbus to be able to transmit data to the sensor so that ultimately a bidirectional operation of the connector module becomes possible.

The connector module can further preferably be configured for the monitoring of the presence and/or functional capability of the sensor. Any interruption of the connection line to the sensor or a failure of the sensor can thus be communicated to the fieldbus. In this manner, further devices connected to the fieldbus receive information on an operation readiness of the sensor connected to the connector module.

In an advantageous further development, the connector module is made for automatic registration at the fieldbus after a connection or replacement of the sensor and/or after an interruption of the data communication with the sensor. If the sensor has been replaced or if a defect in the data communication has been eliminated, it is thus not necessary to carry out an initialization of the connector module, or even of the total fieldbus network, caused by a user.

The sensor interface can preferably be made for data communication with a plurality of different sensor types.

The sensor interface can advantageously be made for communication with a standard interface of a sensor, in particular with standard interfaces of different sensor types. It is thus not necessary to use a separate connector module variant for each sensor type used in a fieldbus network. On the other hand, no embodiments of the sensors adapted to the different field bus systems have to be manufactured either. A substantial simplification and a cost-saving associated therewith thereby results in the manufacture, storage and operation.

It is preferred for the bus interface to be made for data communication with a plurality of different fieldbus systems. A further rationalization as well as a universal applicability of the connector modules results from the 10 reduction in connector module variants associated therewith.

Advantageously, a plurality of sensor interfaces and/or a plurality of bus interfaces can be provided for the connection, in particular the simultaneous connection, of a plurality of sensors and/or a plurality of bus systems. It is therefore not only possible to connect different sensors and/or fieldbus systems to the connector module by means of different software, but sensors with different hardware interfaces and/or fieldbuses with different hardware interfaces can also be connected to one and the same connector module in this case simultaneously or sequentially in time.

In a preferred embodiment, the connector module is made for the supply of the sensor with an operating voltage. The sensor therefore does not need any separate voltage supply, but is supplied along with the voltage 25 supply of the connector module. A reduced cabling effort also thereby results in addition to the saving of a voltage supply.

In a further preferred embodiment, the sensor interface is made for the supply of the sensor with an operating voltage via lines provided for the data transmission. This means that the supply voltage and data are transmitted over the same lines, whereby the cabling effort is reduced even further.

The solution of the invention also takes place by a method in accordance with claim 12 and in particular by a method of operating a connector module which is coupled to a sensor via a sensor interface and to a fieldbus via a bus interface, comprising the following steps which run automatically:

transmitting a sensor-specific control file or description file stored in the sensor and/or generated in the sensor to the connector module via the sensor interface;

programming a processor of the connector module by the transmitted control file and/or by a control file generated on the basis of the transmitted description field;

reception controlled by the programmed processor of data transmitted to the connector module from the sensor; —conversion controlled by the programmed processor of the data with respect to their format; and output controlled by the programmed processor of the converted data via the bus interface connected to the fieldbus, with the connector module showing the behavior of the respective connected sensor with respect to the fieldbus.

At the start of operation, the control file or description file stored or generated in the sensor is transmitted to the connector module automatically or on demand. Subsequently, a processor provided in the connector module is initialized on the basis of the transmitted files. The processor now controls the reception of sensor data and their output at the bus interface, with it carrying out a conversion of the data format. In accordance with the initially mentioned image, a new shelf corresponding to the shelf existing in the sensor is therefore put up in the connector module and serves for the transmission of all the possible object types of the sensor. The connector module thereby takes over the properties and the behavior of the sensor and represents them outwardly, i.e. with respect to the fieldbus, as a substitute for the sensor.

It is preferred for the circuit for the exchange of data to receive data transmitted from the fieldbus from the bus interface.

The circuit for the exchange of data can further preferably output data received from the bus interface at the sensor interface. Bidirectional communication between the connector module and the fieldbus or the sensor, that is ultimately also between the fieldbus and the sensor, is thereby made possible. The connector module or the sensor can also receive data in this manner which were output from other devices connected to the fieldbus.

Data transmitted from the sensor and/or from the fieldbus can be temporarily stored in the circuit of the connector module. For example, the connector module can directly respond to queries transmitted by the fieldbus for a specific measured value if this measured value is temporarily stored in the connector module. The temporarily stored measured value is, for example, updated at predetermined intervals or on a change in the measurement parameter detected by the sensor. This is in particular sensible when the sensor requires a specific time for the carrying out of the measurement.

The connector module can advantageously carry out an automatic 30 registration as a sensor at the fieldbus after an operation start.

It is preferred for the connector module to monitor the presence and/or functional capability of the sensor.

In a preferred embodiment, the connector module can carry out an automatic registration at the fieldbus after a replacement of the sensor and/or after an interruption of the data communication with the sensor.

It is furthermore preferred for the connector module to receive control commands from at least one further device connected to the fieldbus and to generate control commands directed to the sensor from the received control commands and to transmit them to it. It is hereby possible, for example, that the sensor carries out a current measurement on demand by the device, with the result of this measurement in turn being transmitted to the device.

BRIEF DESCRIPTION OF DRAWINGS

Further embodiments of the invention are described in the dependent claims. The invention will be explained in the following with reference to an embodiment and to the drawings. There are shown in them:

DETAILED DESCRIPTION

Figure 1:
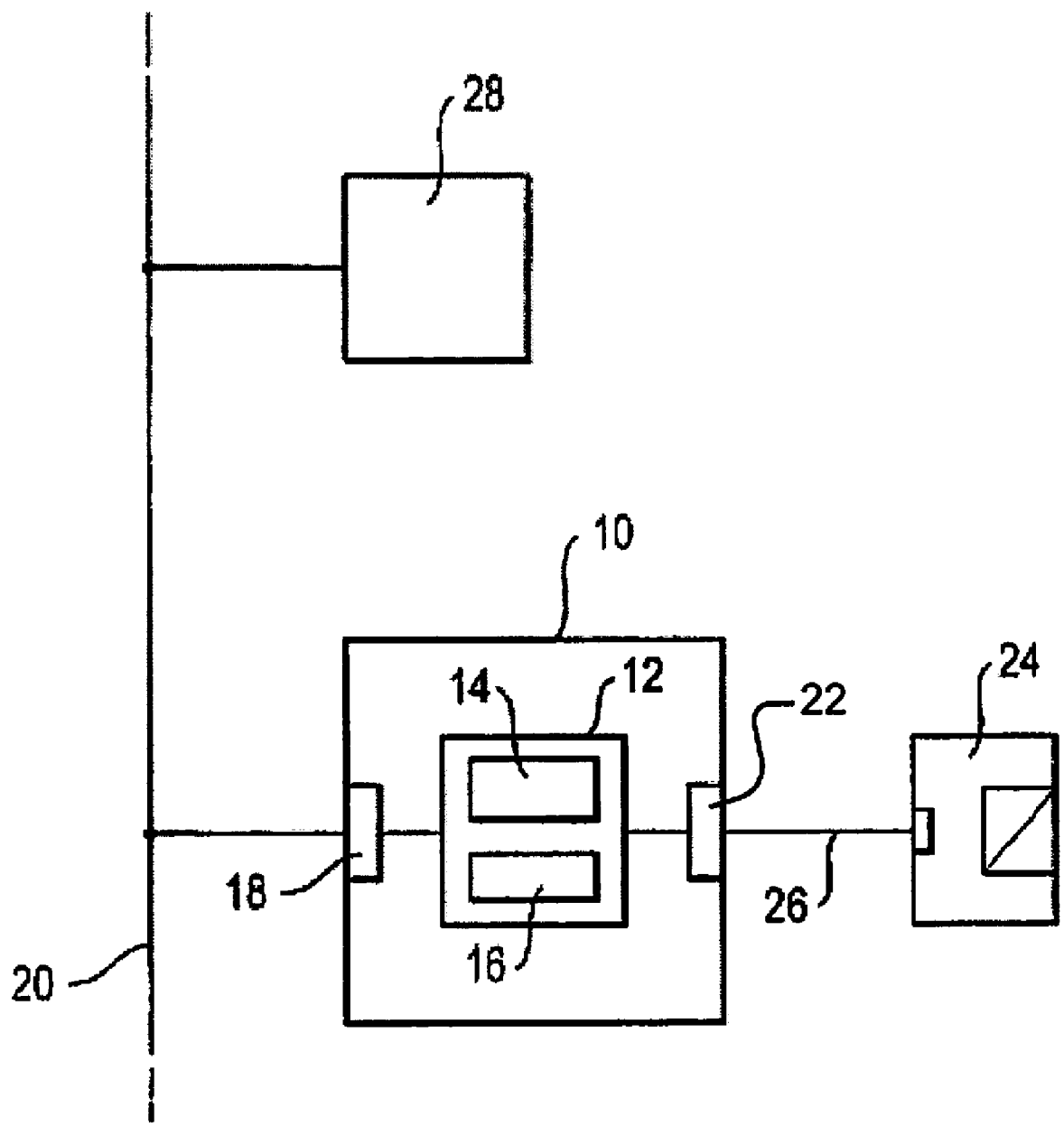
FIG. 1 the schematic design of a connector module in accordance with the invention connected to a fieldbus and to a sensor.

The block diagram shown in FIG. 1 shows a connector module 10 with a circuit 12 which includes a processor 14 and a memory 16.

The circuit 12 is connected via a bus interface 18 present in the connector module 10 to a fieldbus 20 which is only shown sectionally here.

The circuit 12 is furthermore connected to a sensor interface 22 which is likewise present in the connector module 10 and to which a sensor 24 is connected via a sensor line 26. The connection between the sensor interface 22 and the sensor 24 can be made e.g. as an Ethernet link.

The supply voltage required for the operation of the sensor 24 is transmitted simultaneously with the data via the sensor line 26, with the method "power over Ethernet" (PoE) being able to be used here.

The connector module 10 itself is supplied with the operating voltage via a power supply not shown here. The fieldbus 20 can be made as a PROFIBUS, for example.

A control device 28 which satisfies the function of a central control (master) is connected to the fieldbus 20.

Figure 2:
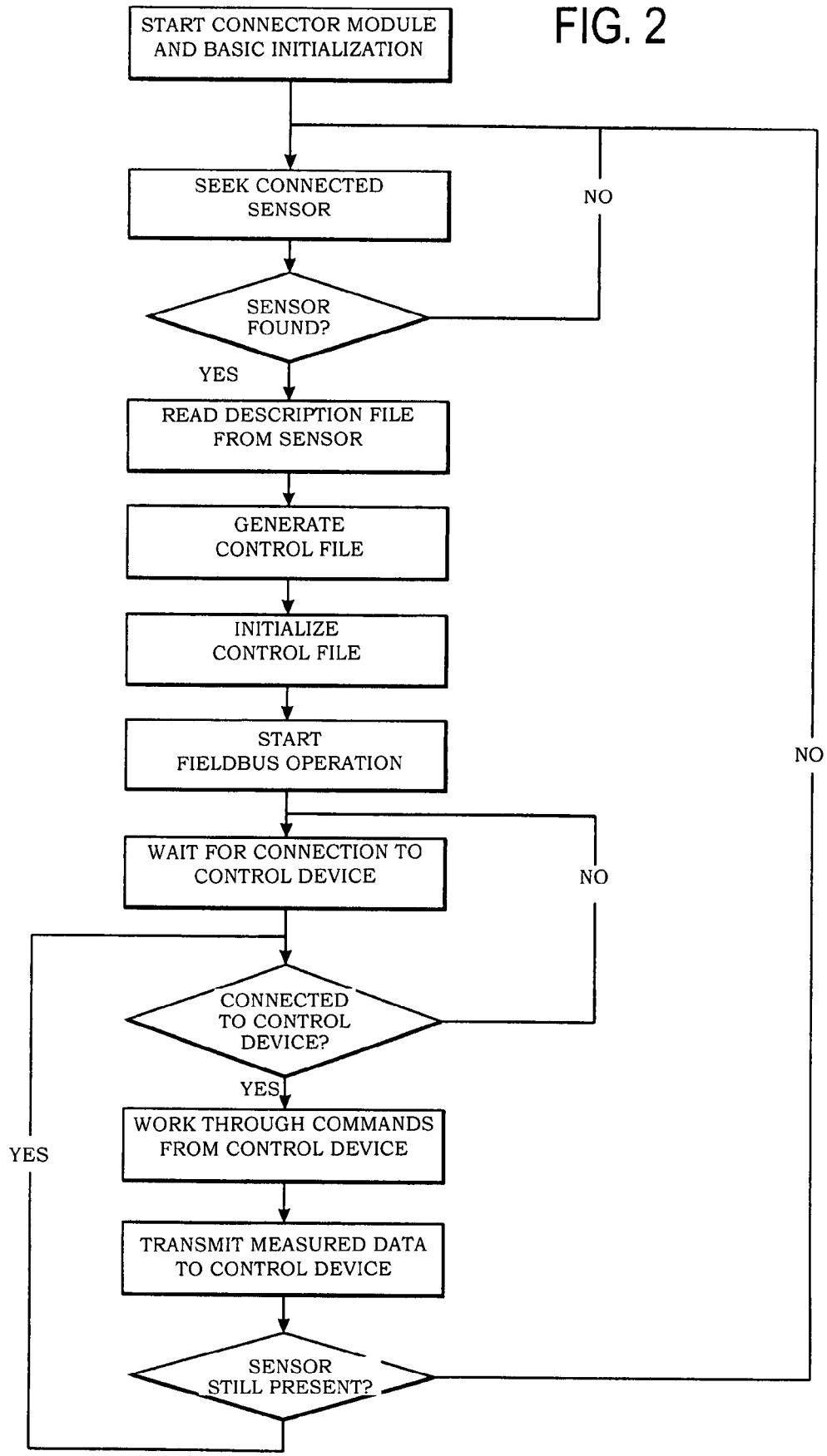
FIG. 2 a flowchart of the method of operating the connector module of FIG. 1.

The initialization of the connector module 10 and the running operation will be described in the following with reference to the flowchart shown in FIG. 2.

First, the connector module 10 is started and a basic initialization is carried out.

Subsequently, the connector module 10 seeks a connected sensor 24 and attempts to communicate with it. This step is repeated for so long until a sensor 24 is found and communication is established with it. The repetition of this step can also be carried out, for example, on an operational defect or on a replacement of the sensor 24.

In the next step, a description file stored in the sensor 24 is read out of the sensor 24. This description file is stored, for example, in the data format XML (extended markup language) and describes all the variables, methods, messages and events which can be achieved via the data communication.

A control file for the control of the exchange of data is now generated in the connector module 10 from this description file transmitted to the connector module 10.

The processor 14 is programmed for the exchange of data with the fieldbus 20 with the now following initializing of the control file.

In the next step, the connector module 10 waits for so long until it is connected to the control device 28. If a data query takes place by the control device 28, it is answered by the transmission of measured data or status information. If a command is transmitted by the control device 28 which can be a demand to the sensor 24 for the regular delivery of data to the control device 28, for example, this command is now worked through.

The connector module 10 now again checks the presence of the sensor 24. If this is the case, the presence of the control device 28 is likewise checked. If this check likewise delivers a positive result, the connector module 10 is ready for the processing of further data queries by the control device 28.

If the check of a presence of the sensor 24 turns out negative, a jump back to the second step of the flowchart is made and a connected sensor 24 is in turn sought. If a sensor 24 is found, the steps already previously described take place.

The operating readiness of the connector module 10 and the sensor 24 is thereby automatically reestablished after a temporary interruption or after a replacement of the sensor 24.

If a first sensor 24 is replaced by a second sensor of a different type, e.g. if an optoelectronic sensor is replaced by a temperature sensor, a new control file is generated on the basis of the description file of the second sensor, with said control file being specific to the second sensor and thus being in a position to process all the objects of this sensor.

10 connector module
12 circuit
14 processor
16 memory
18 bus interface
20 fieldbus
22 sensor interface
24 sensor
26 sensor line
28 control device

The invention claimed is:

1. A connector module for the connection of a sensor to a fieldbus, comprising:
    at least one sensor interface for the connection of the connector module to an interface of the sensor;
    at least one bus interface for the connection of the connector module to an interface of a fieldbus; and
    a circuit for the exchange of data to receive the data and to convert a format of the data from the sensor interface and to output the converted data at the bus interface, wherein:
        the circuit for the exchange of data includes a memory for the intermediate storage of a sensor-specific control file or description file received from the sensor interface, with the control file or description file being able to be processed in the circuit such that the connector module shows the behavior of the respective connected sensor with respect to the fieldbus; and
        the circuit for the exchange of data is configured for the reception of data from the bus interface.

2. A connector module in accordance with claim 1, characterized in that the circuit includes a processor programmable by the stored control file and/or by a control file generated on the basis of the description file.

3. A connector module in accordance with claim 1, characterized in that the control file or description file contains a sensor-specific device identification for the respective fieldbus.

4. A connector module in accordance with claim 1, characterized in that the connector module is made for the automatic registration at the fieldbus after an operating start.

5. A connector module in accordance with claim 1, characterized in that the connector module is made for the monitoring of the presence and/or functional capability of the sensor.

6. A connector module in accordance with claim 1, characterized in that the connector module is made for the automatic registration at the fieldbus after an exchange of the sensor and/or after an interruption of the data communication with the sensor.

7. A connector module in accordance with claim 1, characterized in that the sensor interface is made for data communication with a plurality of different sensor types.

8. A connector module in accordance with claim 1, characterized in that the sensor interface is made for communication with standard interfaces of different sensor types.

9. A connector module in accordance with claim 1, characterized in that the bus interface is made for data communication with a plurality of different fieldbus systems.

10. A connector module in accordance with claim 1, characterized in that a plurality of sensor interfaces and/or a plurality of bus interfaces are provided for simultaneous connection of a plurality of bus systems and/or a plurality of sensors.

11. A connector module in accordance with claim 1, characterized in that the connector module is made for the supply of the sensor with an operating voltage.

12. A connector module in accordance with claim 11, characterized in that the sensor interface is made for the supply of the sensor with an operating voltage via lines provided for the data transmission.

13. A connector module for the connection of a sensor to a fieldbus, comprising:
   at least one sensor interface for the connection of the connector module to an interface of the sensor;
   at least one bus interface for the connection of the connector module to an interface of a fieldbus; and
   a circuit for the exchange of data to receive the data and to convert a format of the data from the sensor interface and to output the converted data at the bus interface, wherein:
      the circuit for the exchange of data includes a memory for the intermediate storage of a sensor-specific control file or description file received from the sensor interface, with the control file or description file being able to be processed in the circuit such that the connector module shows the behavior of the respective connected sensor with respect to the fieldbus; and
      the circuit for the exchange of data is configured for the output of the data received from the bus interface at the sensor interface.

14. A method of operating a connector module which is coupled via a sensor interface to a sensor and via a bus interface to a fieldbus, comprising:
   transmitting a sensor-specific control file or description file stored in the sensor and/or generated in the sensor to the connector module via the sensor interface; and
   programming a processor of the connector module by the transmitted control file and/or by a control file generated on the basis of the transmitted description field, wherein:
      reception is controlled by the programmed processor of data transmitted to the connector module from the sensor,
      conversion is controlled by the programmed processor of the data with respect to format;
      output is controlled by the programmed processor of the converted data via the bus interface connected to the fieldbus, with the connector module showing the behavior of the respective connected sensor with respect to the fieldbus, and
      the circuit for the exchange of data receives data transmitted from the fieldbus from the bus interface.

15. A method in accordance with claim 14, characterized in that the connector module carries out an automatic registration as a sensor at the fieldbus after a start of operation.

16. A method in accordance with claim 14, characterized in that the connector module monitors the presence and/or functional capability of the sensor.

17. A method in accordance with claim 14, characterized in that the connector module carries out an automatic registration at the fieldbus after a replacement of the sensor and/or after an interruption of the data communication with the sensor.

18. A method in accordance with claim 14, characterized in that the connector module receives control commands from at least one device connected to the fieldbus and generates control commands directed to the sensor from the received control commands.

19. A method of operating a connector module which is coupled via a sensor interface to a sensor and via a bus interface to a fieldbus, comprising:
   transmitting a sensor-specific control file or description file stored in the sensor and/or generated in the sensor to the connector module via the sensor interface; and
   programming a processor of the connector module by the transmitted control file and/or by a control file generated on the basis of the transmitted description field, wherein:
      reception is controlled by the programmed processor of data transmitted to the connector module from the sensor;
      conversion is controlled by the programmed processor of the data with respect to their format, and
      output is controlled by the programmed processor of the converted data via the bus interface connected to the fieldbus, with the connector module showing the behavior of the respective connected sensor with respect to the fieldbus, and
      the circuit for the exchange of data outputs data received from the bus interface at the sensor interface.

* * * * *

UNITED STATES PATENT AND TRADEMARK OFFICE
CERTIFICATE OF CORRECTION

PATENT NO. : 7,793,017 B2  Page 1 of 1
APPLICATION NO. : 11/820289
DATED : September 7, 2010
INVENTOR(S) : Roland Gehring It is certified that error appears in the above-identified patent and that said Letters Patent is hereby corrected as shown below:

Title Page, References Cited under FOREIGN PATENT DOCUMENTS

Insert --DE19847701A1, dated 2000-04-20--
Insert --EP1229414A2, dated 2002-08-07--
Insert --EP1533770A1, dated 2005-05-25--
Insert --DE10353345A1, dated 2005-06-02--

Title Page, References Cited under OTHER DOCUMENTS

Insert --European Search Report for European Patent Application No. 06 013 606.6, dated November 29, 2006; 3 pages.--
Insert --Translation of the European Search Report Dated November 29, 2006 for European Patent Application No. 06 013 606.6; 4 pages.--

Column 1, Line 13  Insert --.-- after "type""
Column 4, Line 42  Delete "betemporarily" and insert --be temporarily--

Signed and Sealed this
First Day of February, 2011

David J. Kappos
*Director of the United States Patent and Trademark Office*